United States Patent [19]
Walkowski et al.

[11] Patent Number: 5,341,679
[45] Date of Patent: Aug. 30, 1994

[54] RESISTOR CARD FUEL LEVEL SENDER WITH FLOAT ARM ACTUATOR

[75] Inventors: Paul D. Walkowski; Duane M. Schliebe, both of Ann Arbor, Mich.

[73] Assignee: G.T. Products, Inc., Ann Arbor, Mich.

[21] Appl. No.: 61,868

[22] Filed: May 14, 1993

[51] Int. Cl.⁵ .................... G01F 23/32; G01F 23/36
[52] U.S. Cl. .......................................... 73/317; 73/313
[58] Field of Search .................. 73/313, 317, 305; 338/33; 340/620

[56] References Cited

U.S. PATENT DOCUMENTS

| | | | |
|---|---|---|---|
| 3,774,449 | 11/1973 | Carol, Jr. | 73/313 |
| 3,798,970 | 3/1974 | Schlanzky et al. | 73/313 |
| 4,107,998 | 8/1978 | Taylor | 73/313 |
| 4,114,130 | 9/1978 | Sutton et al. | 73/317 |
| 4,157,038 | 6/1979 | Yamamoto | 73/313 |
| 4,441,364 | 4/1984 | Montie | 73/313 |
| 4,532,491 | 7/1985 | Rau et al. | 73/317 |
| 4,557,144 | 12/1985 | Lucchini | 73/317 |
| 4,685,332 | 8/1987 | Betterton et al. | 73/309 |
| 4,700,170 | 10/1987 | Weaver | 338/68 |
| 4,780,705 | 10/1988 | Beano | 340/620 |
| 4,841,771 | 6/1989 | Glover et al. | 73/317 |
| 4,843,883 | 7/1989 | Glover et al. | 73/301 |
| 4,845,486 | 7/1989 | Knight et al. | 340/618 |
| 4,870,861 | 10/1989 | Ohtani et al. | 73/313 |
| 4,873,865 | 10/1989 | Gaston | 73/317 |
| 4,911,011 | 3/1990 | Fekete et al. | 73/313 |
| 4,924,704 | 5/1990 | Gaston | 73/317 |
| 4,928,526 | 5/1990 | Weaver | 73/313 |
| 4,931,764 | 6/1990 | Gaston | 338/185 |
| 4,967,181 | 10/1990 | Iizuka et al. | 340/450.2 |
| 4,974,570 | 12/1990 | Szwargulski | 123/509 |
| 4,986,113 | 1/1991 | Harrison et al. | 73/49 |
| 5,184,510 | 2/1993 | Rossman | 73/290 |
| 5,191,912 | 3/1993 | McDaniel | 137/413 |
| 5,197,445 | 3/1993 | Casari | 123/514 |
| 5,201,298 | 4/1993 | Shearn | 123/514 |

FOREIGN PATENT DOCUMENTS

| | | | |
|---|---|---|---|
| 1389934 | 1/1965 | France | 73/313 |
| 0018720 | 1/1985 | Japan | 73/313 |
| 0201324 | 9/1987 | Japan | 73/313 |
| 2048495 | 12/1980 | United Kingdom | 73/313 |

Primary Examiner—Diego F. F. Gutierrez
Attorney, Agent, or Firm—Krass & Young

[57] ABSTRACT

An improved liquid level fuel sender of the type having a resistor card mounted in a plastic housing affixed to the interior of a fuel tank, and a float arm assembly connected to pivot relative to the housing to slide a contact wiper over the resistor card to generate signals corresponding to fuel level. The connecting structure and bearing surfaces of the components of the fuel sender are designed to increase the stability, uniformity, accuracy and repeatability of the sender over its life. In one embodiment the plastic housing defines a first pivot bearing for the float arm assembly, and the ground terminal defines a second pivot bearing for the float arm assembly spaced from the first pivot bearing to improve rotational stability of the float arm assembly. A support arm and wiper arm assembly are mounted therebetween, the support arm connected to the float arm and freely rotating on an axial bearing surface on the housing to transfer float arm motion to the conductive wiper arm. The mounting and bearing surfaces for the support arm and ground terminal are located to improve the precision of their alignment relative to one another and the resistor card, ensuring uniform wiper arm contact forces.

14 Claims, 5 Drawing Sheets

RESISTOR CARD FUEL LEVEL SENDER WITH FLOAT ARM ACTUATOR

FIELD OF THE INVENTION

The present invention relates in general to liquid level fuel senders of the type in which a liquid-responsive float arm moves a contact wiper over a variable resistance conductive path on a resistor card. The position of the contact wiper on the card corresponds to the level of liquid fuel in the tank as measured by the float. As the wiper moves along the surface of the card, the difference in resistance is measured in an electric circuit indicates the level of liquid fuel in the tank.

BACKGROUND OF THE INVENTION

Variable resistance fuel level senders are known in the art for indicating the level of liquid fuel in a vehicle fuel tank. Such fuel senders typically comprise a housing or body mounted in or on the interior of the fuel tank, a resistor card mounted on the housing, a float arm assembly pivotally connected to the housing, and a conductive wiper connected to and operated by the float arm. The conductive wiper has a sliding contact which moves along the resistive path of the card, and a ground contact to a ground terminal. A positive terminal on the housing supplies electric current to the card with suitable connections from a remote power source.

The resistive path on the card is often arcuate, comprising a plurality of conductive pads with varying resistance along the length of the arc. The float arm pivots on an axis approximately coincident with the center of the arc. The float arm assembly includes a bent wire float arm with a float mounted at its free end and a pivot pin extending through a hole in the housing. A plastic support arm or carrier is connected to the float arm and rotates with the float arm, transferring float arm rotation to the conductive wiper, and provides stop surfaces which interact with stops on the housing to define the limit of travel of the float arm and wiper.

Such an assembly is found in the Stewart-Warner Corporation fuel sender used in the Ford Motor Co. 1992 Saturn automobile. Other fuel senders having similar structure are shown in U.S. Pat. Nos. 4,873,865 and 4,924,704 to Gaston, and 4,700,170 to Weaver. An example of a typical resistor card is disclosed in U.S. Pat. No. 4,931,764 to Gaston.

An omnipresent concern with these types of fuel senders is the need for uniformity, stability and consistency in the fit and operation of the moving parts over the lifetime of the unit. Metal-to-metal wear, plastic creep and thermal expansion caused by temperature changes in the fuel tank environment, fuel additive effects on electrical contact surfaces and plastics, relaxation of spring tension, unbalanced moment forces, and inherently weak or unstable mounting and support arrangements can all affect the reliability and repeatability of the readings from the fuel sender unit. Some of the areas particularly critical to reliable and consistent functioning are the sliding wiper interfaces, the spring rates and contact forces of the conductive wiper, the pivot support and bearing surfaces of the float arm assembly, and the different expansion rates of metal-to-plastic connections. Reducing the amount of variation, imbalance and loose fit in these areas of the fuel sender greatly increases the unit's reliability and calibration accuracy. None of the prior art to date has adequately and systematically addressed the above-listed factors in a comprehensive manner.

SUMMARY OF THE INVENTION

The present invention is an easily-manufactured, stable, tightly-fit and accurate fuel sender assembly of the float arm/resistor card type. The sender has a plastic rheostat housing which can be affixed to the interior of the fuel tank, the plastic housing mounting a resistor card defining an arcuate path of variably-resistive conductive pads. A float arm assembly is connected to the plastic housing to rotate in a plane parallel to the resistor card. The float arm assembly operates a conductive wiper arm to slide a first contact along the arcuate path of the resistor card.

The plastic housing includes a positive terminal to supply power to the resistor card, and a ground terminal with which a second contact portion of the wiper arm is in continuous sliding contact.

As the float arm assembly moves up and down in response to rising and decreasing fuel levels, it moves the first sliding contact of the wiper arm along the arcuate resistive path on the resistor card to generate signals corresponding to the fuel level in a known manner.

The float arm assembly pivots relative to the plastic housing on two spaced bearings, a first pivot bearing defined by the housing and a second pivot bearing defined by the ground terminal. A support arm is connected to the float arm assembly to pivot therewith, the support arm carrying the wiper arm between the first and second pivot bearings.

The fuel sender unit of the present invention includes bifurcated mounting legs on the plastic housing for connecting it to the fuel tank (or mounting structure within the fuel tank). The mounting legs are bifurcated and dimensioned to remain loaded under tension when mounted. Bifurcating or splitting the legs provides a degree of lateral tension when inserted in a mounting slot, and ensures that they will fit a wide range of mounting slot sizes and still remain under tension. This feature maintains the fuel sender unit in tight engagement with its mount in the fuel tank to avoid assembly rotation and subsequent loss of calibration accuracy.

The plastic housing includes a number of locking tabs which retain the resistor card in place on the housing. The locking tabs are curved and tapered in cross section to distribute loading stress evenly throughout. This serves to offset the effect of plastic creep caused at stress concentrations by thermal cycling in the environment of the fuel tank and fuel additives.

The body further includes a number of through-holes associated with the resistor card locking tabs to improve ease of assembly, particularly when automated, and to improve the deflection of the resistor card locking tabs. The through-holes further help align the resistor card upon assembly for proper calibration with respect to the float arm, by defining a positional "window" within which the card is aligned.

The plastic housing provides a pivot axis and first bearing for the float arm assembly, comprising a bore extending through the housing to define a radial bearing surface for a pivot pin portion of the float arm.

Coaxial with the float arm pivot axis is an axial bearing surface for the support arm, which is connected to pivot with the float arm assembly. The support arm is connected to the float arm assembly at a point radially spaced from the pivot axis, and rides freely on the single axial bearing surface on the housing.

The support arm carries the conductive wiper arm assembly for rotation with the float arm. The wiper arm assembly includes a body portion which is connected to the plastic support arm, an outer card-contacting wiper arm, and at least one, preferably two, inner wiper arms which remain in sliding contact with the ground terminal.

The ground terminal is mounted essentially coaxially with the pivot axis of the float arm assembly, the ground terminal defining a second pivot bearing for the float arm pivot pin comprising a hole through which the pivot pin extends. The ground terminal in one embodiment is a flat, plate-like member having a central portion whose underside provides a sliding contact surface for the inner wiper arms of the wiper arm assembly.

The ground terminal is mounted to the plastic housing in a manner which maximizes control over the alignment of the pivot bearings and rotational stability and uniformity of the float arm assembly and the wiper arm forces. In one embodiment, the ground terminal is connected to the plastic housing with a pair of widely-spaced support posts bracketing the pivot axis of the float arm assembly. The posts define support surfaces which are parallel to the axial bearing surface of the support arm and to the resistor card. The dimension or tolerance between the ground terminal support surfaces and the support arm bearing surface controls the contact force of the inner wiper arms mounted between the plastic support arm and the lower surface of the ground terminal. By placing the ground terminal support surfaces and the support arm bearing surface on the same side of the housing mold, only one dimension need be controlled.

Control over the contact force of the outer wiper arm is also significantly increased since only one dimension, that between the plane of the resistor card and the support arm bearing surface, need be controlled.

The axial spacing of the ground terminal pivot bearing from the pivot bearing on the plastic housing greatly increases the torsional stability of the float arm assembly. Additionally, the ground terminal pivot bearing is precisely located during assembly by structure on the support posts to ensure uniform contact forces between the terminal pivot bearing and the float arm over the entire range of float arm sweep. In one embodiment the mounting posts are provided with mounting pins which engage holes in the ground terminal to locate the ground terminal pivot bearing precisely. Placement of the mounting pins on the same side of the housing with the plastic support arm bearing surface reduces the number of dimensions which must be controlled during manufacture to ensure a precise fit.

The area of the ground terminal in contact with the plastic housing is maximized to distribute pressure and reduce the effect of plastic creep in the environment of the fuel tank.

In a further embodiment, the ground terminal includes bifurcated end portions which engage slots in the plastic housing in a crip or swedged fit.

The positive terminal is connected to the resistor card with a rigid arm which prevents the card from sliding relative to the housing. The positive terminal is secured to the housing in a manner which isolates the arm from blade connector deflection. In a particular embodiment the arm itself is provided with a locking tab which engages the housing to prevent shifting.

The wiper arm assembly is rigidly connected to the plastic support arm at one point and with a sliding expansion joint at a second point to eliminate contact force changes between the wiper arm and the plastic support arm due to differential expansion.

Wear between electrical contact surfaces is another area which is carefully controlled to maintain the fuel sender's reliability. In one particular embodiment of the present invention, the ground terminal comprises a softer material than the inner wiper contact arms, providing a sacrificial wear surface. This ensures a continuously freshly polished surface with good electrical contact characteristics throughout the sender life. In a further embodiment, the face of the ground terminal in contact with the inner wiper arms includes a number of slots which serve to clean wear debris from the wipers. The slots are preferably spaced a distance greater than the width of either of the inner wiper arms, angularly arranged so that only one wiper arm is in contact with a slot at any one time.

The inner and outer contact arms of the wiper arm assembly, when installed in the fuel sender, have their moments balanced to eliminate uneven contact forces between the wiper arm and the ground terminal and resistor card.

In a preferred embodiment the outer contact arm of the wiper arm assembly comprises a twin beam wiper supporting a contact rivet in contact with the resistor card. The twin beams of the wiper are separated by a triangular cutout. By adjusting the size of the triangular cutout, the spring rate of the outer contact arm can be adjusted during production.

These and other features of the present invention will become apparent upon a further reading of the specification.

DETAILED DESCRIPTION OF THE DRAWINGS

Figure 1:
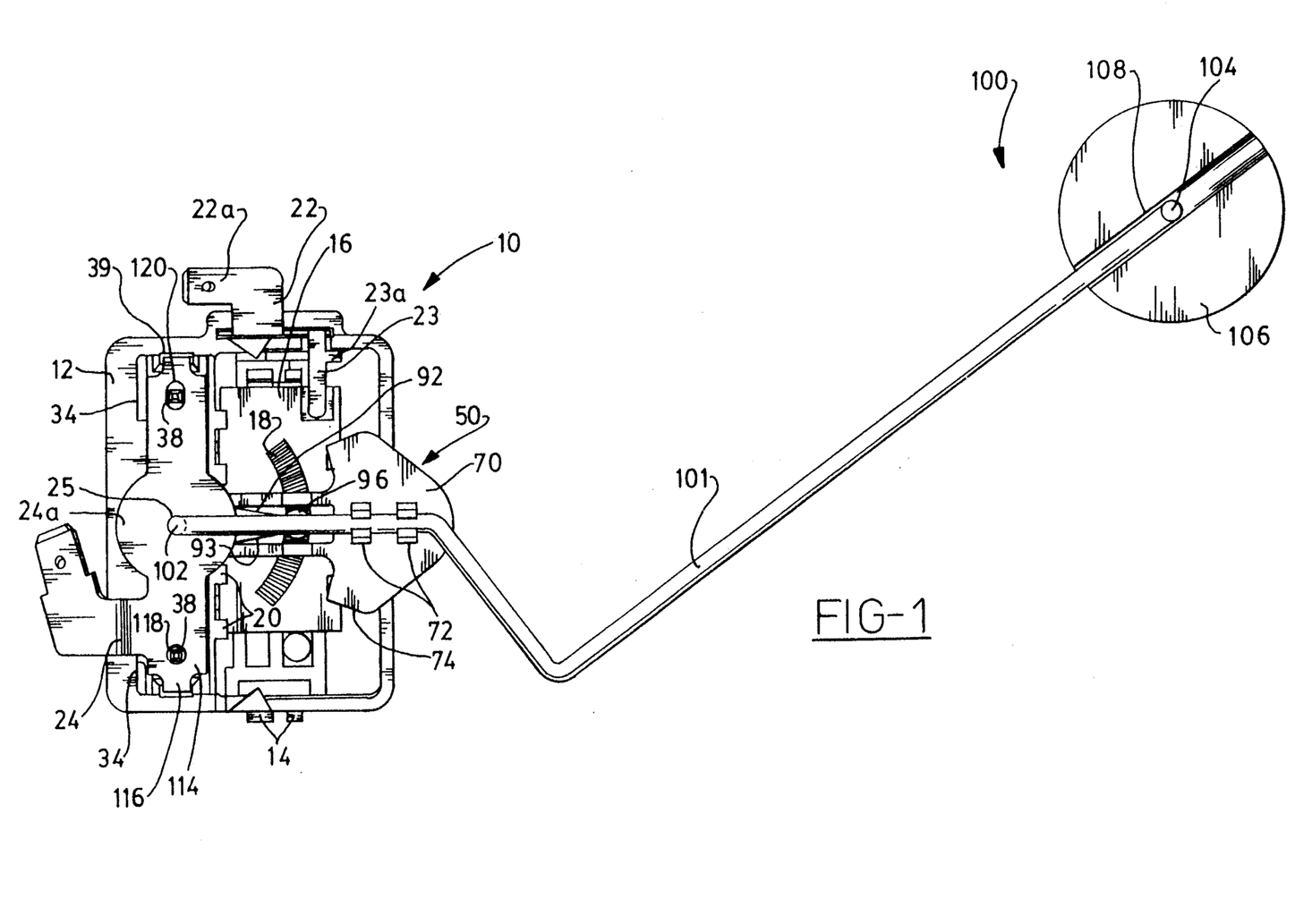
FIG. 1 is a plan view of an assembled fuel sender unit according to the present invention.
Figure 2:
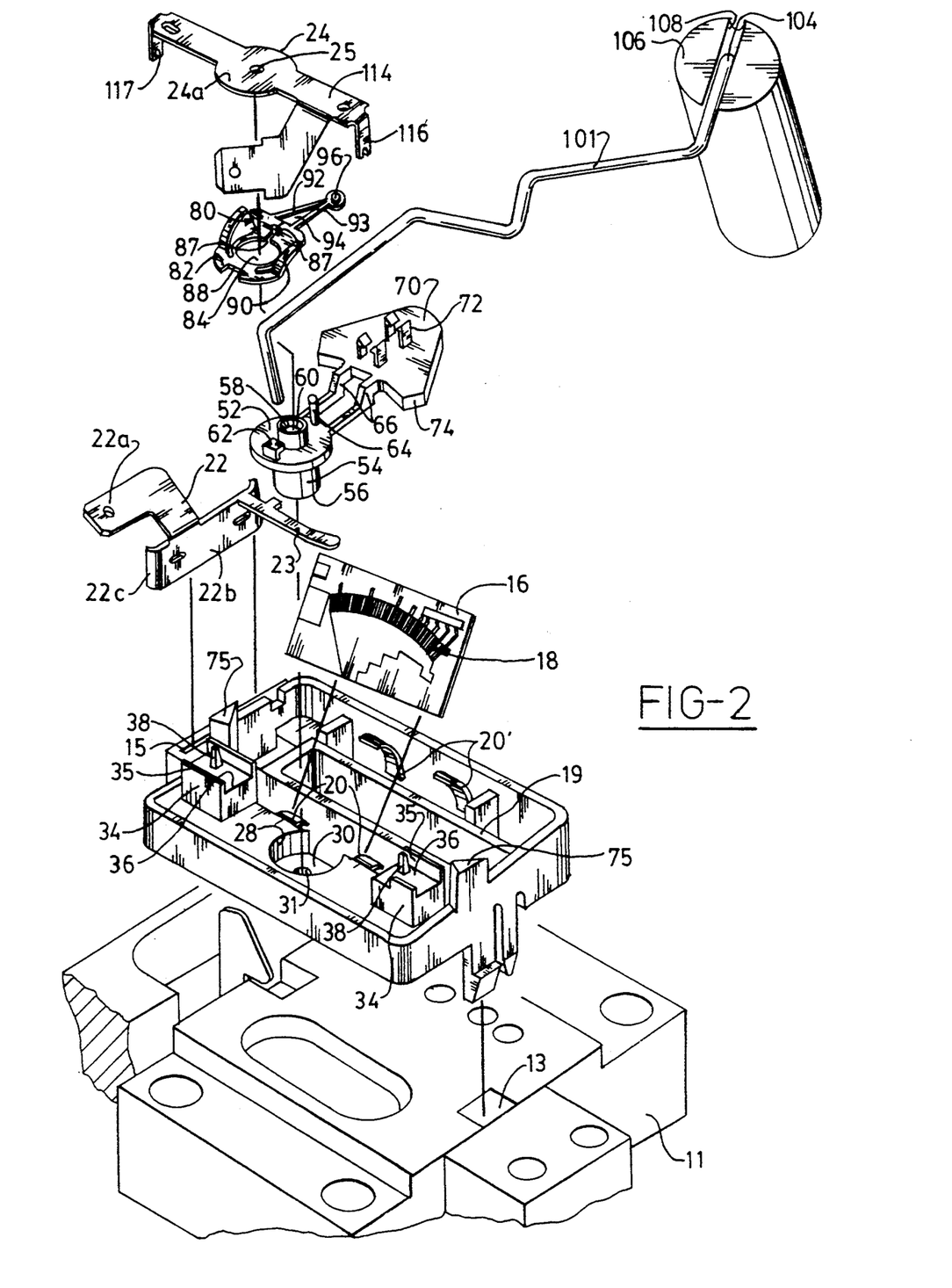
FIG. 2 is an exploded assembly view of the components of the fuel sender of FIG. 1.

Referring to FIGS. 1 and 2, a fuel sender unit 10 according to the present invention is shown comprising a plastic rheostat housing 12 supporting a thick film resistor card 16. Resistor card 16 defines an arcuate array of spaced resistive conductor pads 18, and is securely mounted on plastic housing 12 by a plurality of snap-fit locking tabs 20 integrally molded in the housing.

Housing 12 is itself securely mounted on a suitable mounting fixture 11 in the interior of a fuel tank, via bifurcated snap lock feet 14 inserted into mounting slots 13.

An electrically-conductive positive terminal 22 is mounted on the housing, connected by blade connector 22A to an external electrical lead (not shown), and to resistor card 16 by soldered appurtenance arm 23.

A flat, plate-like, electrically-conductive ground terminal 24 is also supported on housing 12, supported on surfaces 30 of mounting posts 34 above and parallel to the plane of resistor card 16 in a manner described below. Ground terminal 24 includes a central hole or pivot bearing 25 through which the horizontal pivot pin portion 102 of a wire float arm assembly 100 extends in rotatable fashion. Ground terminal 24 includes a circular central body portion 24a and two opposed rectangular legs 114 with which terminal 24 is mounted to posts 34.

The float arm assembly includes wire float arm 101, a pivot pin 102, a float pin 104 parallel to pin 102 on the free end of wire float arm 101, and a cylindrical float 106 securely mounted on float pin 104 via a suitable through-bore and groove 108. In the illustrated embodiment float 106 is made from a fuel-resistant closed cell foam, for example Nitrophyl TM.

A plastic carrier or support arm assembly 50 is connected to float arm 101 and is pivotally mounted on housing 12 coaxial with the pivot pin 102 of float arm assembly 100. Referring to both FIGS. 1 and 4, plastic support arm 50 includes a circular hub 52 from whose lower surface extends a cylindrical pivot bushing 54. The lower surface 56 of pivot bushing 54 defines an annular axial thrust bearing surface. Support arm 50 also includes an upper annular flange 58, chamfered at 59. A tightly toleranced bore 60 of a diameter approximately equal to that of float arm pivot pin 102 extends through annular flange 58, circular hub 52 and pivot bushing 54.

Figures 4, 4A, 5A:
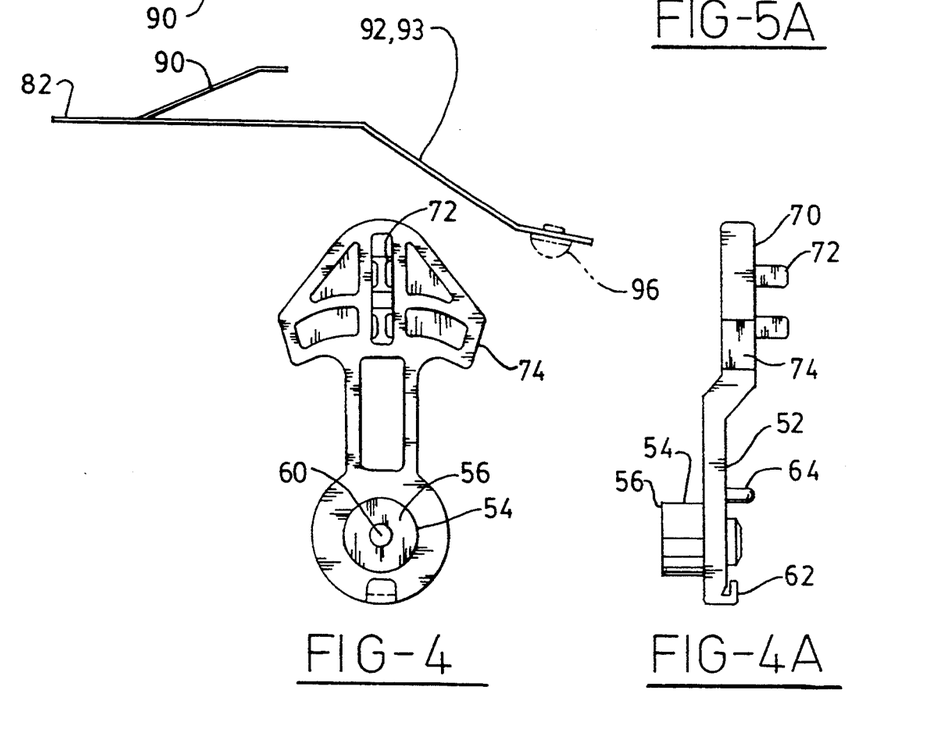
FIG. 4 is a plan view of a support arm of the fuel sender housing of FIG. 1.
FIG. 4A is a side view of the support arm of FIG. 4.
FIG. 5A is a side view of the wiper arm of FIG. 5.

The top surface of circular hub 52 has an L-shaped retainer hook 62 formed on its rear edge and a heat stake pin 64 on its front portion, hook 62 and heat stake 64 pin aligned with the line of symmetry of support arm 50.

Support arm 50 further includes a pair of spaced support beams 66 having angled extensions connected to a triangular or arrowhead-shaped support head 70. Support head 70 includes two pairs of chamfered locking tabs 72 which secure wire float arm 101 in a snap-fit. Head 70 is also provided with angled stop surfaces 74 whose angle corresponds to that of the arcuate resistor array 18 on resistor card 16.

The pivot bushing 54 of plastic support arm 50 is mounted in rotatable fashion within a cylindrical blind bore 28 on plastic housing 12. Bore 28 orients support arm 50 during assembly, but has a diameter slightly greater than bushing 54 and does not engage support arm 50 after pivot pin 102 is inserted therethrough to align it with the float arm pivot axis. Bore 28 surrounds an annular thrust bearing surface 30 which mates with lower bearing surface 56 to permit smooth, level rotation of support arm 50 relative to housing 12. Stops 75 on housing 12 limit the arc of travel of support arm 50 by abutting stop surfaces 74.

Bore 28 in housing 12 also includes a chamfered bore 31 of a diameter approximately equal to that of float arm pivot pin 102.

FIGS. 1 and 2 show that ground terminal pivot bearing 25, support arm bore 60 and housing pivot bore 31 are aligned when housing 12, support arm 50, ground terminal 24 and float arm assembly 100 are assembled, with float arm pivot pin 102 extending through 25, 60, 31 and wire arm 101 fully engaged in tabs 72.

Figure 3:
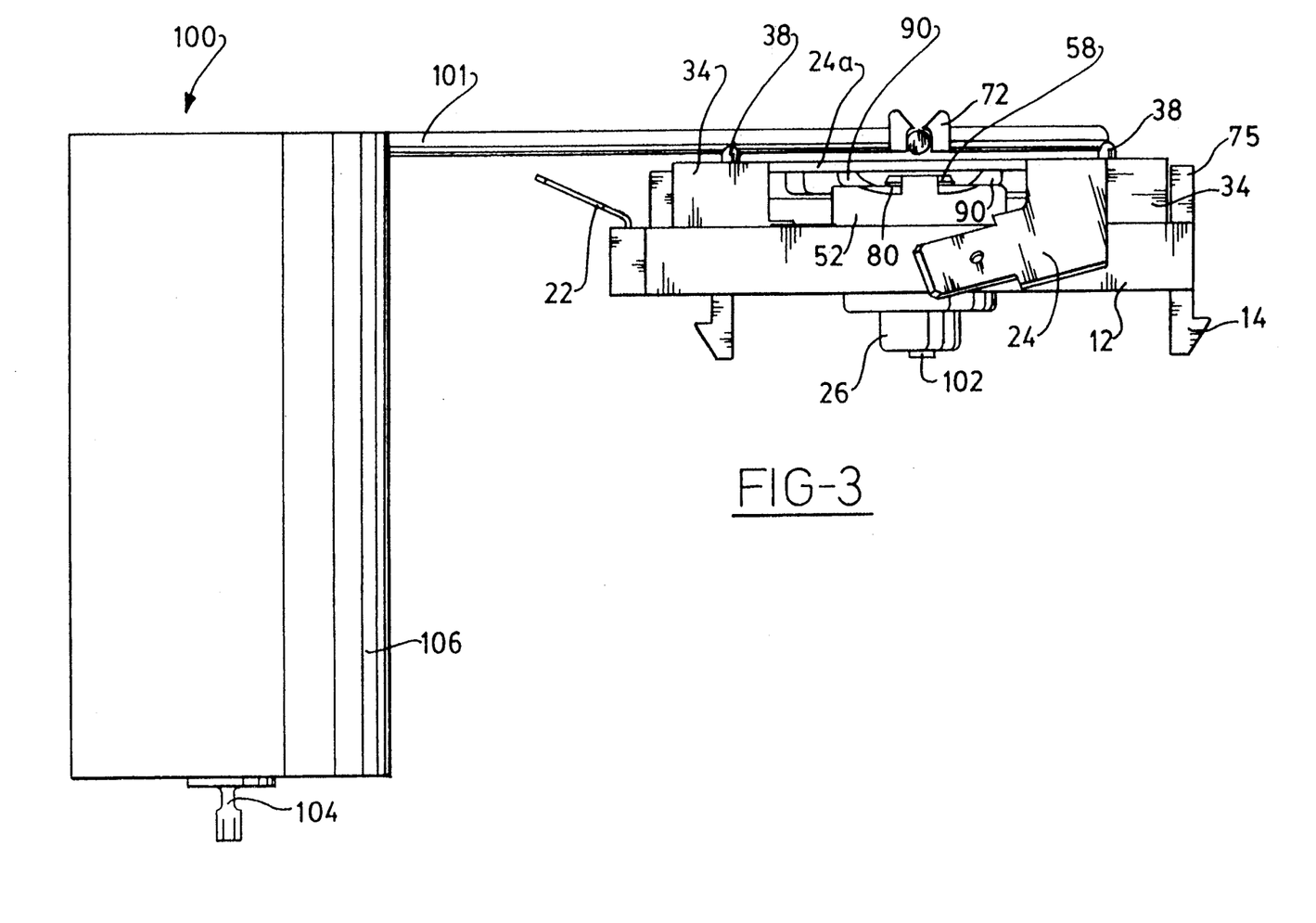
FIG. 3 is a rear side view of the fuel sender of FIG. 1.

Referring now to FIG. 3, housing 12 includes a cylindrical radial bearing sleeve 26 extending from its lower surface. Pivot bore 31 extends through sleeve 26 to define a second pivot bearing for pivot pin 102.

When ground terminal 24, support arm 50 and float arm assembly 100 are assembled to housing 12 as best shown in FIGS. 1 and 3, hole 25 and sleeve 26 define axially spaced bearing/support surfaces for pivot pin 102. Support arm 50 is connected by tabs 72 to move with float arm assembly 100 therebetween, its lower bearing surface 56 mating with axial bearing surface 30 in housing 12 to define a smooth, planar axial bearing-/support surface.

Figure 5:
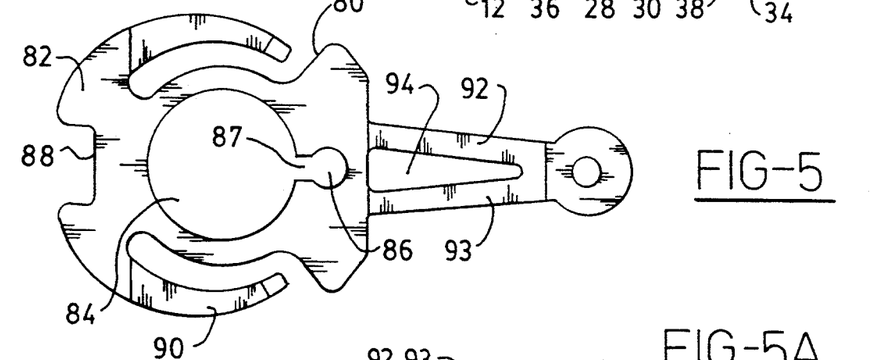
FIG. 5 is a plan view of a wiper arm of the assembled fuel sender of FIG. 1.

Referring to FIGS. 1, 2 and 5, an electrically-conductive wiper arm 80 is carried on support arm 50 between support arm hub 52 and the lower surface of ground terminal 24. Wiper arm 80 includes a body portion 82 having a circular central cutout 84 dimensioned to fit over annular flange 58 on support arm 50. Wiper arm 80 also includes a circular cutout 86 dimensioned to mate with heat stake pin 64, and a rectangular cutout 88 dimensioned to mate with L-shaped retainer hook 62. Circular cutout 86 and 84 and rectangular cutout 88 are radially spaced on wiper arm 80 so that retainer hook 62 overlies wiper arm body 82 when wiper arm 80 is assembled to support arm 50. When assembled, axial and radial gaps between the inner surfaces of L-shaped retainer hook 62 and wiper arm body 82 create a sliding expansion joint to prevent wiper arm contact force variation due to differential metal/plastic expansion.

Wiper arm 80 includes two resilient inner contact arms 90 bent upwardly at an angle relative to body 82. An outer resilient contact arm 92,93 extends from body 82 at a downward angle relative thereto to maintain a contact rivet 96 in contact with resistor card 16. Outer contact arm 92 comprises twin beams separated by a triangular cutout region 94.

In the assembled fuel sender unit 10, as best shown in FIGS. 2 and 3, wiper arm 80 is carried by support arm 50 such that inner contact arms 90 remain in continuous sliding contact with the lower surface of portion 24a of ground terminal 24, and contact rivet 96 on the end of outer contact arm 92 remains in continuous sliding contact with arcuate resistor array 18 on card 16. As cylindrical float 106 rises and falls with the liquid fuel level in the fuel tank, the movement is transmitted via float arm 101 and support arm 50 to wiper 80 to move contact rivet 96 along the resistive path 18, the change in resistance measured to determine the level of fuel in the tank in known manner. Stop surfaces 74 on support arm 50 engage stop posts 75 on plastic housing 12 to limit motion of the float arm assembly and contact rivet 96 to the arcuate resistor array 18.

The dimensions, tolerances and connecting and bearing/support structures of the fuel sender 10 are designed and manufactured in a manner to optimize the stability, accuracy and repeatability of the sender unit.

The snap-lock feet 14 of plastic housing 12 are bifurcated, sufficiently flexible and spaced far enough apart to remain loaded under tension when fuel sender 10 is mounted to a fixture such as that shown schematically at 11 in FIG. 2. The horizontal spacing between flexible lock feet 14 ensures that they mate tightly with a wide range of mounting slots 13, each pair of bifurcated feet 14 exerting an outward and axial loading tension on the slot after insertion. This prevents housing 12 from rotating or shifting both axially and in the plane of card 16 relative to fixture 11, which would affect the accuracy of sender calibration by altering the position of float 106 and wiper contact 96 relative to resistor card 16 for a given fuel level.

Locking tabs 20, 20' which secure resistor card 16 to housing 12 in two planes are curved and tapered from base to tip; i.e., tabs 20 are thicker at their base and taper to a thinner cross-section at their tip. This is a substantial improvement over traditional rectangular cantilever beams, the curved and tapered tabs 20, 20' of the present invention distributing loading stresses more evenly throughout the tabs to prevent material failures. This even distribution of stress serves to reduce the effect of plastic creep found at stress concentrations during temperature swings in the interior of the fuel tank and during gross deformations during the assembly process.

The "left" edge of resistor card 16 is initially inserted underneath the four inboard tabs 20, the opposite edge subsequently snapped under the two outboard tabs 20'. In the illustrated embodiment only the two inside inboard tabs 20 actually engage the resistor card surface; the other two provide a backup function. However, it will be apparent to those skilled in the art that all four or other suitable numbers could be used. Once resistor card 16 is snapped in place, tabs 20, 20' and small "speed bumps" or rounded beads 21a below the inboard tabs secure card 16 in the left-right direction in FIG. 1. Card 106 is calibrated by sliding it up or down and soldering or otherwise affixing it to arm 23 of the positive terminal 22.

Figure 6:
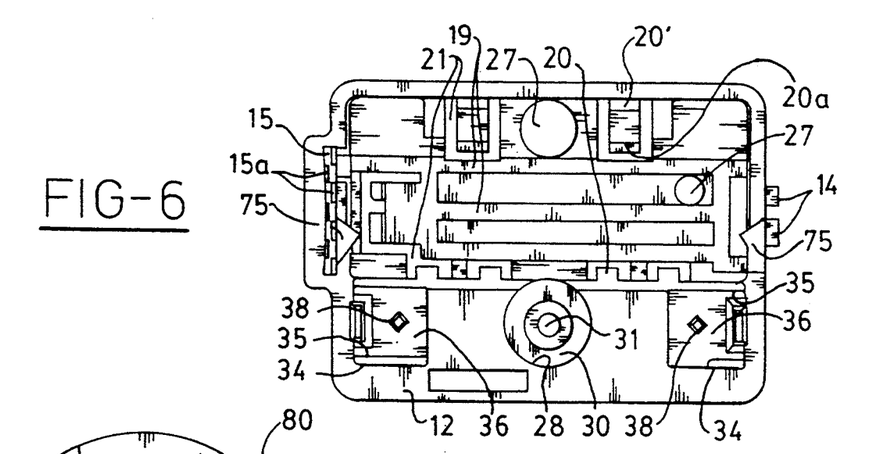
FIG. 6 is a plan view of the housing of the fuel sender of FIG. 1.
Figure 7:
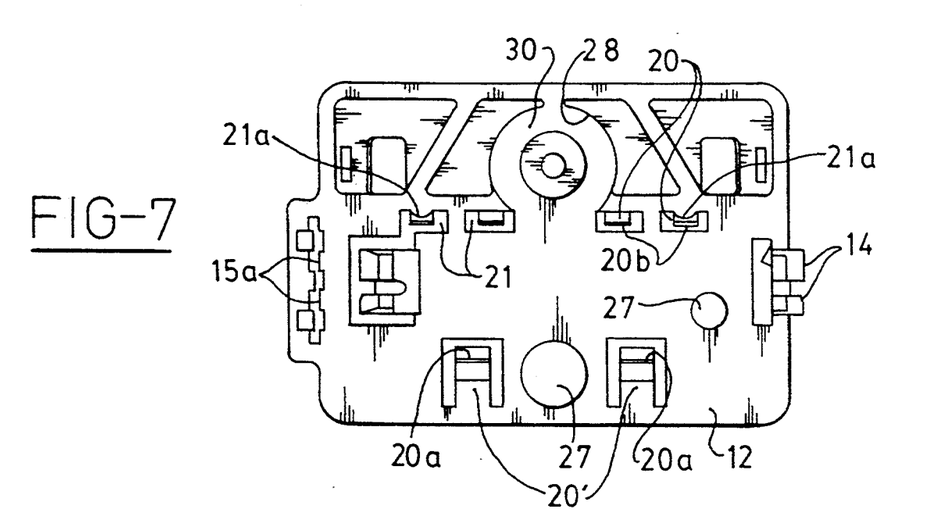
FIG. 7 is a bottom view of the housing of the FIG. 6.

As shown in FIGS. 2, 6 and 7, the flattened, offset ends 20a on outboard tabs 20', the tapered tips 20b on inboard tabs 20, and planar mounting ribs 19 on housing 12 positively hold card 16 from moving in a plane perpendicular to housing 12. Flattened ends 20a engage the surface of card 16 and with the edge-engaging surface of outboard tabs 20' keep card 16 tensioned in two planes when card 16 is mounted on non-deflecting ribs 19, while the tapered tips 20b of the inboard tabs deform or crush against the surface of card 16. In this manner card 16 remains tightly held to the housing without "rattle" between ribs 19 and tabs 20, 20' the flattened ends 20a of outboard tabs 20' exerting downward tension on card 16 while the main portion of outboard tabs 20' exert lateral tension against the card.

The assembly and alignment between resistor card 16 and housing 12 are further enhanced by the use of through-holes 21 extending through plastic housing 12 in association with tabs 20', best shown in FIGS. 6 and 7. Through-holes 21 improve the deflection of the cantilever locking tabs 20, 20' which is particularly helpful in automation-assisted assembly of card 16 to housing 12 and during calibration, by permitting access to the undersurface of tabs 20, 20' for deflection/retraction by automated assembly equipment such as pins inserted through holes 21.

In the illustrated embodiment two edge datums in the form of semi-circular "speed bumps" 21a are provided, to which the left edge of resistor card 16 is matched during assembly. The rounded tops of speed bumps 21a precisely locate the card 16 during assembly, and further provide a sliding surface for the card edge in the up-down direction during calibration. The "window" created by through-holes 21 through and housing 12 will show uneven gaps between card 16 and housing 12 if not properly positioned.

Circular through-holes 27 are also formed in housing 12, providing access for manual or automated assembly tools or sensors to sense and locate the position of card 16. One hole 27 is associated with the "bottom" edge of the resistor card opposite terminal 22 to align it in the up/down direction, and a second hole 27 is located at the "right" edge of card 16 opposite terminal 24 to check location in the left/right direction.

Another critical area for fuel sender accuracy is the rotational mounting and support of the float arm assembly 100 which drives conductive wiper arm 80 relative to card 16 and ground terminal 24. Unevenness or improper alignment of the float arm pivot axis and bearing/support surfaces can cause premature wear of moving parts, fluctuating wiper arm contact forces and rotational instability, all of which reduce the accuracy and effective lifespan of fuel sender 10.

The wide axial spacing of float arm bearings 25,26 provided by ground terminal 24 and housing 12 reduces torsional instability of float arm 100 assembly, maintaining its plane of rotation parallel to that of resistor card 16. This in turn assures uniform contact force between the inner wiper arms 90 and ground terminal 24, and outer wiper arm 92 and resistor card 16.

The uniformity, stability and alignment of radial bearing surface 25 in ground terminal 24 is enhanced by the method and structure for mounting ground terminal 24 to plastic housing 12. Widely-spaced, solid rectangular support posts 34, wide, rectangular ground terminal support legs 114, and long crimping legs 116 provide great stability to terminal 24 and therefore to bearing hole 25. By distributing the holding pressure of legs 114 over the wide area of support surfaces 36, the tendency of plastic creep to shift terminal 24 or unevenly load radial bearing 25 is minimized.

The placement and location of legs 114 on support surfaces 36 of support posts 34 further ensures good initial and maintained alignment of bearing hole 25 relative to card 16 and the axial alignment and bearing structures/surfaces of housing 12 and support arm 50. Chamfered pins 38 on support posts 34 orient and wedge mounting holes 118,120 of ground terminal 24 tightly in place. Mounting pins 38 on support surfaces 36 are integrally molded with housing 12 and mate with mounting pin slots 118,120 on legs 114 to precisely position the ground terminal above and parallel to the plane of the resistor card. The taper of mounting pins 38 provides a tight wedge fit when legs 114 of the ground terminal are flush with support surfaces 36, further reducing the risk of shifting or unevenly loading bearing 25 caused by thermal expansion differences between housing 12 and terminal 24. The elongated mounting pin cutout 120 provides tolerance in the up-down direction, maintaining bearing hole alignment in one plane without exerting loading forces on the rheostat housing 12.

Locking tabs or legs 116 on the ends of legs 114 mate with chamfered slots 39 on the outside edges of support post 34, supplying some orientation to ground terminal 24 to keep it flat on support surfaces 36. Locking tabs 116 are further provided with splayed or bifurcated prongs 117 which spread apart and remain loaded in tension once inserted in slots 39, stabilizing ground terminal 24 relative to housing 12 similar to the manner in which bifurcated snap lock feet 14 stabilize plastic housing 12 relative to fixture 11.

The location and manner of forming support surfaces 36 relative to the bearing surface 30 on housing 12 further improves precise assembly and long-term stability and uniformity in bearing and contact forces. The dimension between ground terminal support surfaces 36 and parallel support arm bearing surface 30 controls the contact force of inner wiper arms 90 against the lower surface of ground terminal 24. By placing ground terminal support surfaces 36 and support arm bearing surface 30 on the same side of the housing, only one dimension need be controlled during the manufacture or molding of housing 12. This is a substantial improvement over the prior art, in which several dimensions need to be properly controlled or toleranced during manufacture to control the various contact forces of the wiper arm assembly.

By placing the support arm bearing surface 30 on the same side of the housing as resistor card 16, only a single dimension from bearing surface 30 to card 12 need be controlled on the housing during manufacture to ensure proper and uniform contact force between outer wiper 92 and card 16. Similarly, only a single dimension on the plastic support arm 50 from the support arm hub 52 to lower surface 56 needs to be controlled to maintain both sets of contact forces.

In short, then, the present invention requires control over only two dimensions in the plastic housing 12, and one on the plastic support arm 50, during manufacture to ensure proper contact force for all points of the wiper arm assembly.

Likewise, placement of mounting pins 38 on the same side of housing 12 with wiper-carrying support arm bearing surface 30 holds the number of controlled dimensions to a minimum for proper contact between the inner wiper arms 90 and ground terminal 24. Because wiper arm assembly 80 is sandwiched between support arm 50 and ground terminal 24, the dimension between support surfaces 36 and bearing surface 30 controls contact force.

When the ground terminal 24 is manufactured, alignment cutouts 118,120 and bearing hole 25 are punched simultaneously to eliminate positioning errors. In particular, this helps align the ground terminal bearing 25 with the housing bearing 31 to achieve an accurate wiper arm axis of rotation.

Once resistor card 16 is properly aligned on housing 12 soldering or otherwise affixing connector 23 of positive terminal 22 secures the card relative to housing 12. The manner of mounting positive terminal 22 in slot 15 in housing 12 and its connection to card 16 prevents shifting of resistor card 16 if the connector end 22a of terminal 22 is deflected, for example when making an electrical connection. Slot 15 in housing 12 is provided with a number of staggered and opposed chamfered teeth 15a which "bite" into mounting tab 22b of terminal 22 to securely lock it relative to housing 12.

In the illustrated embodiment small slots 22d on terminal mounting tab 22b lockingly engage the two outboard teeth 15a. As a further security measure, the outboard wall 15b in the illustrated embodiment of slot 15 curves or bows inwardly, and yields when terminal 22 is inserted to maintain spring tension on terminal 22.

Connector arm 23 connecting positive terminal 22 to card 16 extends from mounting tab 22b, not connector portion 22a, and is therefore isolated from loading forces exerted on connector portion 22a of terminal 22.

Mounting tab 22b is further provided with tapered ribs 22c along its edges to further tighten its fit in slot 15.

While mounting tab 22 is positively secured in slot 15 against the outer surface of housing 12, connector arm 23 further includes a small tab 23a engaging the inner surface of housing 12 to further prevent any shifting of arm 23 and card 16 relative to the housing.

It is well known that different materials, e.g., metal and plastic, have different rates of thermal expansion. The sliding expansion joint created by L-shaped retainer hook 62 eliminates contact force changes on wiper arm 80 to differential expansion of the plastic support assembly 50 and the metal wiper. The gap or tolerance between rectangular cutout 88 and retainer hook 62 allows relative expansion/contraction between support arm 50 and wiper arm 80 without loading on either part.

The structure and method of manufacture of the wiper arm itself adds to the stability, uniformity and accuracy of the fuel sender unit 10. The width of twin beams 93 of outer contact arm 92 controls the spring rate of contact arm 92 and therefore the contact force of rivet 96 on card 16. The width of twin beams 93 is a function of the size or width of triangular cutout 94. By varying the size of triangular cutout 94 during production, the manufacturer can quickly and easily adjust the spring rate of the wiper arm assembly 80. This is a significant improvement over the prior art, where wiper contact force is typically controlled by adjusting the bend angle of an outer wiper arm of constant width.

The heat stake cutout 86 in wiper arm assembly 80 includes a rectangular slot 87 extending to central opening 84. During the heat staking process, deposition of melted plastic from pin 64 in this rectangular slot, adhering to the plastic of circular hub 52, positively prevents rotation of wiper arm 80 relative to support arm 50. This anti-rotation feature eliminates hysteresis in the sender readings caused by lost motion of the contact rivet relative to rotation of the float arm and support arm 50.

The wiper arm contact forces, and the moments created thereby, are balanced in magnitude and direction to eliminate preferential tip of the wiper arm in one direction or another to prevent the contact forces from tipping the bearing axis off center, which would cause hysteresis and contribute to bearing wear. This is achieved by balancing the outer wiper arm moment relative to the moments exerted by the two symmetrical inner contact arms 90.

All electrical contact surfaces in fuel sender 10 of the present invention are optimized to reduce debris buildup and enhance electrical conductivity. Ground terminal 24 is made of a material softer than that of wiper arm 80 to provide a sacrificial wear surface with respect to the inner contact arms 90. This sacrificial wear provides a continuously fresh contact surface with good electrical characteristics throughout the sender life. The lower side of the ground terminal 24 in contact with inner wiper arms 90 is further provided with a radial pattern of spaced slots (not shown), angularly positioned to prevent simultaneous contact of inner arms 90 with slots. The edges of the slots wipe sacrificial wear debris from the wiper arms to improve the electrical signal.

It will be apparent to those skilled in the art that many variations and modifications of the present invention can be made and still lie within the scope of the appended claims. The foregoing description is of an illustrative embodiment, and is not intended to be limiting.

We claim:

1. An easily-manufactured, stable, accurate fuel level sender for sensing the level of liquid fuel in a fuel tank, the sender having a plastic rheostat housing for connection to the interior of a fuel tank, a resistor card connected to the plastic housing and defining an arcuate path of variably-resistive conductive pads, positive and ground terminals mounted on the plastic housing, a float arm assembly rotatably connected to the plastic housing to rotate in a plane parallel to the resistor card in response to liquid fuel level changes in the tank, a plastic support arm connected to pivot with the float arm assembly about a common axis between the float arm and the plastic housing, a conductive wiper arm carried by the support arm to rotate with the float arm assembly, the wiper arm having a resistor contact in continuous sliding contact with the arcuate path of the resistor card and at least one ground contact in continuous sliding contact with the ground terminal, wherein the plastic housing forms a first pivot bearing for the float arm below the plane of the resistor card, and the ground terminal forms a second pivot bearing for the float arm above the plane of the resistor card to improve bearing stability, the wiper arm is carried on the plastic support arm between the support arm and the ground terminal, the plastic support arm is rotatably mounted on a single thrust bearing surface formed on the plastic housing, the ground terminal is rigidly mounted on a pair of support posts on the plastic housing spaced from the pivot axis of the float arm assembly, and the support posts include support surfaces for the ground terminal parallel to the plane of the resistor card and the support arm bearing surface.

2. Apparatus as defined in claim 1, wherein the ground terminal comprises a flat, plate-like member having two opposed legs whose ends are connected to the support posts.

3. Apparatus as defined in claim 1, including first locating pin means on a first support surface, second locating pin means on a second support surface, hole means on a first end of the ground terminal mating with the first locating pin means, and slot means on a second end of the ground terminal mating with the second locating pin means to precisely position the ground terminal pivot bearing coaxial with the pivot bearing on the plastic housing.

4. Apparatus as defined in claim 1, wherein the plastic housing includes bifurcated snap-lock feet to engage mounting slots in the fuel tank, the bifurcated feet remaining loaded under tension when inserted in the mounting slots to secure the rheostat housing in two planes relative to the mounting slots.

5. Apparatus as defined in claim 1, wherein the plastic housing includes a plurality of curved and tapered locking tabs which deform to receive the resistor card in a snap-fit relative to the housing, the locking tabs tapering from a maximum base cross-sectional area to a minimum cross-sectional area at free ends which engage the resistor card.

6. Apparatus as defined in claim 1, wherein the plastic housing includes a side wall and the positive terminal includes a mounting tab, a connector blade, and a connector arm, the mounting tab connected to the housing in a slot on a first side of the plastic housing side wall, the connector arm connected to the resistor card and having a tab portion engaging the opposite side of the side wall.

7. An easily-manufactured, stable, accurate fuel level sender for sensing the level of liquid fuel in a fuel tank, the sender having a plastic rheostat housing for connection to the interior of a fuel tank, a resistor card connected to the plastic housing and defining an arcuate path of variably-resistive conductive pads, positive and ground terminals mounted on the plastic housing, a float arm assembly rotatably connected to the plastic housing to rotate in a plane parallel to the resistor card in response to liquid fuel level changes in the tank, a plastic support arm connected to pivot with the float arm assembly about a common axis between the float arm and the plastic housing, a conductive wiper arm carried by the support arm to rotate with float arm assembly, the wiper arm having a resistor contact in continuous sliding contact with the resistor card arc and at least one ground contact in continuous sliding contact with the ground terminal, the improvement comprising:

a first pivot bearing for the float arm assembly formed on the plastic housing below the plane of the resistor card;

an axial thrust bearing surface formed in the plastic housing, the support arm rotatably mounted on the thrust bearing surface;

a pair of spaced support posts formed on the plastic housing, the support posts providing a pair of support surfaces parallel to the plane of the resistor card and of the thrust bearing surface, the support surfaces located in a plane above the plane of the resistor card;

the ground terminal mounted on the support surfaces of the support posts, the ground terminal defining a second pivot bearing for the float arm assembly above the plane of the resistor card, the second pivot bearing coaxial with the first pivot bearing, the wiper arm carried on the support arm between the support arm and the ground terminal.

8. Apparatus as defined in claim 7, wherein the wiper arm includes a body portion mounted on the support arm in the plane generally parallel to the planes of the resistor card and the ground terminal, the resistor and ground contacts of the wiper arm extending from the wiper arm body, the wiper arm body rigidly connected at one point to the support arm and slidingly connected at a second point to the support arm to prevent contact force changes between the resistor and ground contacts, the resistor card and the ground terminal caused by differential expansion of the support arm and the wiper arm.

9. Apparatus as defined in claim 8, wherein the wiper arm body is connected to the first point by an anti-rotational heat stake joint, and at a second point by a sliding expansion joint.

10. An easily-manufactured, stable, accurate fuel level sender for sensing the level of liquid fuel in a fuel tank, the sender having a plastic rheostat housing for connection to the interior of a fuel tank, a resistor card connected to the plastic housing and defining an arcuate path of variably-resistive conductive pads, positive and ground terminals mounted on the plastic housing, a float arm assembly rotatably connected to the plastic housing to rotate in a plane parallel to the resistor card in response to liquid fuel level changes in the tank, a plastic support arm connected to pivot with the float arm assembly about a common axis between the float arm and the plastic housing, a conductive wiper arm carried by the support arm to rotate with float arm assembly, the wiper arm having a resistor contact in continuous sliding contact with the resistor card arc and at least one ground contact in continuous sliding contact with the ground terminal, the improvement comprising:

a pair of spaced posts formed on the plastic housing of the fuel sender, the support posts having support surfaces parallel to the plane of the resistor card and the plane of rotation of the support arm, wiper arm and float arm assembly, the ground terminal comprising a plate-like element connected at each end to the support surfaces on the support posts, the ground terminal having a hole defining a pivot bearing aligned with the pivot axis of the float arm assembly, wiper arm and support arm, a pivot pin portion of the float arm assembly extending through the pivot bearing in the ground terminal, the wiper arm being sandwiched between a support surface on the support arm and the lower surface of the ground terminal with the ground contact of the wiper arm in constant contact with the lower surface of the ground terminal.

11. An easily-manufactured, stable, accurate fuel level sender for sensing the level of liquid fuel in a fuel tank, the sender having a plastic rheostat housing for connection to the interior of a fuel tank, a resistor card connected to the plastic housing and defining an arcuate path of variably-resistive conductive pads, positive and ground terminals mounted on the plastic housing, a float arm assembly rotatably connected to the plastic housing to rotate in a plane parallel to the resistor card in response to liquid fuel level changes in the tank, a plastic support arm connected to pivot with the float arm assembly about a common axis between the float arm and the plastic housing, a conductive wiper arm carried by the support arm to rotate with the float arm assembly, the wiper arm having a resistor contact in continuous sliding contact with the arcuate path of the resistor card and at least one ground contact in continuous sliding contact with the ground terminal, wherein the plastic housing forms a first pivot bearing for the float arm below the plane of the resistor card, and the ground terminal forms a second pivot bearing for the float arm above the plane of the resistor card to improve bearing stability, the rheostat housing including a plurality of curved and tapered locking tabs which deform to receive the resistor card in a snap-fit relative to the housing, the locking tabs comprising a first set of locking tabs engaging a first side of the resistor card, and second set of locking tabs engaging an opposite side of the resistor card, the tips of the first set of locking tabs initially engaging the top surface of the resistor card upon assembly in deformable manner, and the second set of locking tabs subsequently engaging the top surface and edge surface of the resistor card in a nondeformable fit.

12. Apparatus as defined in claim 11, wherein the plastic housing adjacent the first set of locking tabs includes a plurality of rounded projections engaging the edge of the resistor card to define a sliding surface.

13. Apparatus as defined in claim 11, wherein the plastic housing includes a through-hole extending through the housing and coinciding with one side of the resistor card to permit access to the resistor card for locating the resistor card relative to the housing perpendicular to the locking direction of the locking tabs.

14. Apparatus as defined in claim 13, wherein the plastic housing includes a second through-hole coinciding with the side of the resistor card held by the second set of locking tabs.

* * * * *